P. LOE.
WINDOW FOR VEHICLE CURTAINS.
APPLICATION FILED APR. 25, 1919.
1,317,512. Patented Sept. 30, 1919.
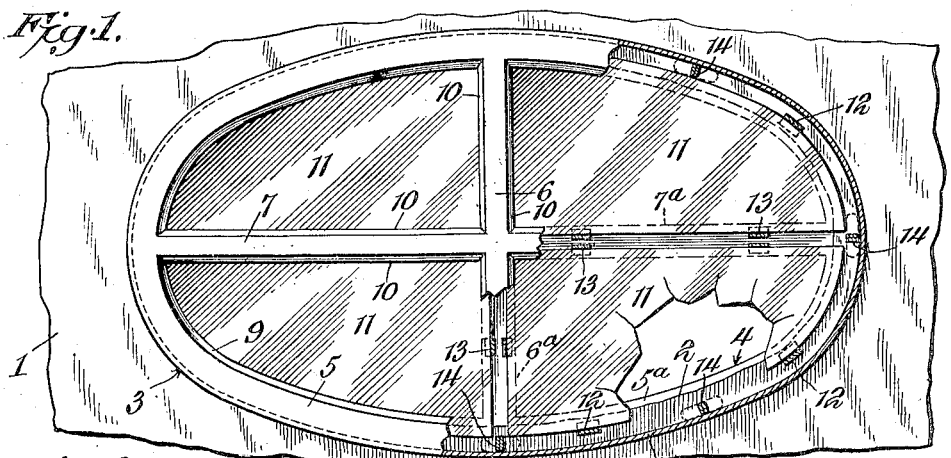
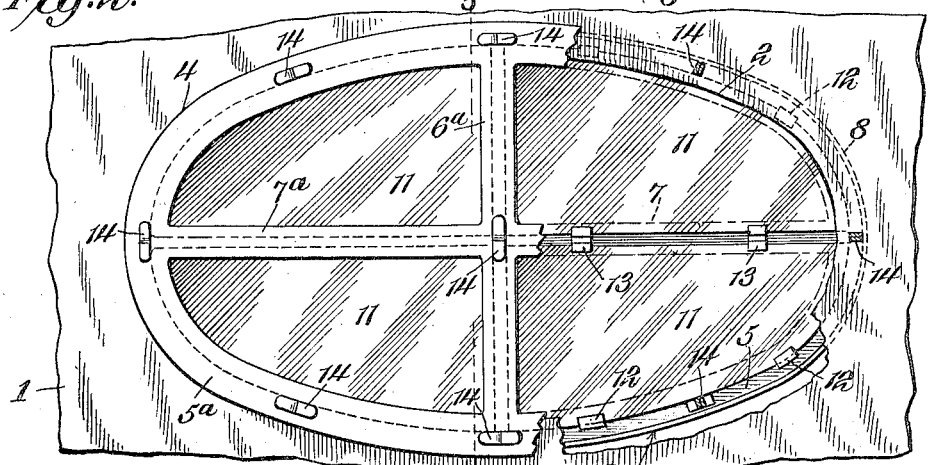
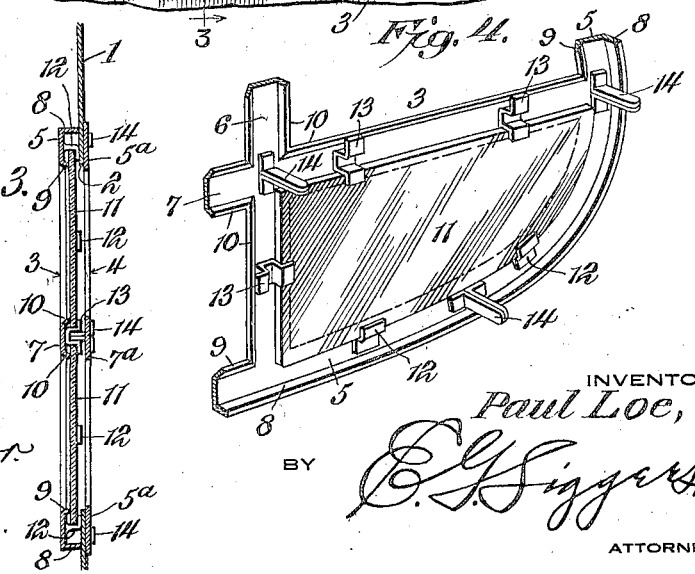
WITNESSES
Howard D. Orr
F. T. Chapman
INVENTOR,
Paul Loe,
BY
ATTORNEY

UNITED STATES PATENT OFFICE.

PAUL LOE, OF EAST STANWOOD, WASHINGTON.

WINDOW FOR VEHICLE-CURTAINS.

1,317,512.  Specification of Letters Patent.  Patented Sept. 30, 1919.

Application filed April 25, 1919. Serial No. 292,635.

*To all whom it may concern:*

Be it known that I, PAUL LOE, a citizen of the Dominion of Canada, residing at East Stanwood, in the county of Snohomish and State of Washington, have invented a new and useful Window for Vehicle-Curtains, of which the following is a specification.

This invention has reference to windows for vehicle curtains, more especially the rear curtain of an automobile, although by no means confined to such particular use.

The object of the invention is to provide a particularly strong and simple window, permitting the use of relatively small pieces of glass so that in the event of damage the loss may be proportionately small and repairs may be rapidly made, at times not even requiring the removal of the window from the curtain.

In accordance with the invention, there is provided a frame of sheet metal or other material, preferably of channel material and carrying fastening devices of suitable shape, and in conjunction with the frame there is provided another frame of similar outline, the two frames being designed to clamp panes of glass between them, each pane forming a fractional portion of the complete window, whereby breakage or other damage necessitating replacing may mean no more than the substitution of one of the fractional portions of the window. The two frame members not only serve to hold the glass panes in place but to lock the frame, as a whole, in the curtain, which latter has a suitably cut-out portion to permit light to pass through the glass panes.

The invention will be best understood from a consideration of the following detailed description taken in connection with the accompanying drawing forming part of this specification, with the understanding, however, that the invention is not confined to any strict conformity with the showing of the drawing, but may be changed and modified so long as such changes and modifications mark no material departure from the salient features of the invention as expressed in the appended claims.

In the drawing:—

Figure 1 is an elevation of the window from the outside, certain portions being broken away to reveal parts otherwise hidden from view.

Fig. 2 is a view similar to Fig. 1 but taken from the inside of the curtain and window.

Fig. 3 is a section on the line 3—3 of Fig. 2.

Fig. 4 is a perspective view of the inner face of a portion of the outside frame member showing one glass pane in place.

Referring to the drawing, there is shown a portion of a window curtain 1 which may be taken as the rear curtain of an automobile top, but which may also be taken as indicative of any vehicle curtain where the invention is applicable. The curtain 1 is provided with a cut-out 2 which, in the particular showing of the drawing, is oval, but it is to be understood that such particular shape is not obligatory, although it is customary to make the windows of rear automobile curtains of oval contour.

The frame comprises a front member 3 and a rear member 4 of approximately or actually the same exterior size but differing somewhat in cross sectional shape. The outer or main member 3 of the frame is made up of a marginal portion or bar 5 and cross bars 6, 7 respectively, the cross bars being usually two, as indicated. In particularly small windows the cross bars may be omitted in whole or in part. The bars constituting the main section 3 of the window frame are of channel form, thereby greatly stiffening the structure and also adding to its appearance. The bar 5 has an outer flange 8 of greater depth than its inner flange 9, which latter may slope to provide a chamfer finish about the inner edge, the same chamfer finish being continued along both sides of each bar 6 and 7 with the depth of the flange the same as that of the flange 9. In the drawing, the flanges of the bars 6 and 7 are indicated by the numeral 10. The chamfer flanges 9 and 10 constitute supports for glass panes 11 of which, in the particular showing of the drawing, there are four, each representing one quarter of an oval. In the base of the channel 5 is a suitable number of clips 12 made of sufficiently ductile metal to permit them to be bent over the edges of the glass panes to hold them in place. In the channel bars 6 and 7 are double clips 13 serving the same purpose, but each double clip holds two panes of glass where engaging them. The frame 3 and the clips 12 and 13 may be made of some such metal as sheet tin, or galvanized sheet iron, or the like, and these holding structures may be soldered or otherwise secured in the channels 5, 6 and 7.

Also soldered or otherwise secured in the channel 5 and at the junction of the channels 6 and 7 are staple-like fasteners 14 similar to a familiar form of paper fastener, although such particular form is not obligatory. The fasteners 14 are longer than the clips 12 and 13.

The frame member 4 may be a flat sheet metal member conforming in shape to the frame member 3 and comprising a marginal bar $5^a$ and cross bars $6^a$ and $7^a$ respectively. The frame member 4 has passages therethrough at intervals corresponding to the positioning of the staples 14 and when the frame, as a whole, is applied to the curtain 1 the latter is traversed by the staples 14 and extends within the outer margins of the glass panes 11, the flanges 8 engaging against the outer face of the curtain. The frame member 4 is applied flat against the curtain with the staples 14 traversing the latter and the frame member 4, whereupon, the projecting free ends of the staples 14 are bent over, constituting holding tongues maintaining the frame member 4 in clamping relation to the curtain, thereby holding the frame member 3 firmly against the outer face of the curtain.

In case of damage requiring the replacing of a single pane, a suitable number of the tongues of the staples 14 may be bent out straight, permitting the pulling out of the staples from the frame member 4 and the curtain 1, thus giving access to the particular glass pane to be replaced. Then the clips 12 and the necessary portions of the clips 13 may be straightened out, permitting the removal of the damaged pane of glass or of any portions of a broken pane of glass that may remain in the frame, and the placing of a new plane of glass, after which the clips are properly bent down, the curtain replaced over the staples 14 and the frame member 4 put back into place, and finally the tongues of the staples 14 bent into clamping position as before.

It is only in the case of extensive damage that it is necessary to remove the entire frame. In most instances the repairs need only be as extensive as the damage and not, as in glass windows ordinarily made for automobiles, requiring the replacing of a glass as large as the window.

The invention provides not only for quick repairs but for cheap repairs and, moreover, on account of the small size of the individual glass panes, the liability of damage is correspondingly reduced. It frequently happens that a blow which would shatter a glass pane as large as the window is insufficient to break the small and therefore stronger panes making up the window.

What is claimed is:—

1. A window structure for automobile and other vehicle curtains, comprising a frame member with marginal and cross bars of channel form, with the external flanges of the marginal part of the frame of greater width than the inner flanges, and of the flanges of the cross bars, clips seated in the marginal and cross channels in coactive relation to the lower flanges of the channels to grip the marginal portions of panes of glass, staples fast in the channels and projecting from the same face thereof as the clips, and another frame member of similar conformation to the first named one and traversed by the staples for clamping the two frame members together with a curtain between them.

2. A window structure for automobile and other vehicle curtains, comprising two frame members of like conformation for face to face juxtaposition, one frame member having marginal and interior cross bars of channel form and the other frame member having marginal and interior cross bars of flat cross section, the channel frame member being provided with clips in the channels coacting with certain of the flanges of the channels to hold glass panes in the frame, and staples mounted in the channels and projecting in a direction to traverse the marginal and cross bars of the other frame member, whereby the glass panes are held by the clips and the two frame members are clamped together, with the curtain between them, by the staples.

3. A window structure for automobile and other vehicle curtains, comprising a frame composed of inner and outer members of like conformation and each member including a marginal bar and cross bars, one of the members having its marginal and cross bars of channel form, clips secured in the channels for holding glass panes each of a size to close one of the spaces defined by the marginal and cross bars, and staples also secured in the channels and of a length to project through the corresponding portions of the second-named frame member and also traverse a curtain between the frame members, whereby to hold the frame members together with the curtain clamped between them.

4. A window structure for automobile and other vehicle curtains, comprising a stiff frame or sash of an area corresponding to the opening to be covered, said frame or sash including an outer and an inner member of like conformation and each composed of marginal and cross bars defining a plurality of openings for as many panes of glass, clips for holding panes of glass, carried by the marginal and cross bars of one of the frame members, and staples also carried by the marginal and cross bars of one of the frame members for traversing the marginal and cross bars of the other frame member to connect the two frame members together with the curtain clamped between them.

In testimony that I claim the foregoing as my own I have hereto affixed my signature.

PAUL LOE.

Witnesses:
L. M. AMUNDSON,
C. O. HJELD.